United States Patent [19]

Powilleit

[11] Patent Number: 4,763,402
[45] Date of Patent: Aug. 16, 1988

[54] METHOD FOR MANUFACTURING AN ANNULAR COMPONENT IN THE FORM OF WOUND FERROMAGNETIC TAPE PROVIDED WITH SLOTS AT AN END FACE FOR USE IN AN ELECTRICAL AXIAL-FIELD MACHINE

[75] Inventor: Siegfried Powilleit, Rosstal, Fed. Rep. of Germany

[73] Assignee: Siemens Aktiengesellschaft, Munich, Fed. Rep. of Germany

[21] Appl. No.: 919,195

[22] Filed: Oct. 15, 1986

[30] Foreign Application Priority Data

Dec. 9, 1985 [DE] Fed. Rep. of Germany ....... 3543482

[51] Int. Cl.⁴ ...................... H02K 15/04; H02K 15/14
[52] U.S. Cl. ......................................... 29/596; 29/605; 310/45
[58] Field of Search ........................ 29/596, 598, 605; 83/171, 651.1; 310/45, 208

[56] References Cited

U.S. PATENT DOCUMENTS

| 3,838,502 | 10/1974 | Sheets | 29/596 |
| 4,403,489 | 9/1983 | Munsterman et al. | 29/596 X |
| 4,675,825 | 6/1987 | DeMenthon | 83/171 X |

FOREIGN PATENT DOCUMENTS

| 700879 | 12/1940 | Fed. Rep. of Germany . |
| 1033768 | 7/1958 | Fed. Rep. of Germany . |

Primary Examiner—Timothy V. Eley
Attorney, Agent, or Firm—Kenyon & Kenyon

[57] ABSTRACT

A ring-shaped component with slots in an end face for use in an electrical axial-field machine is formed by winding a ferromagnetic tape on a rotating winding arbor, coating the tape with a hardenable synthetic resin material at a point upstream of the winding station and baking the wound coated tape while maintaining the tape in the wound configuration. The resulting solid part is then subjected to an electro-erosion process wherein the part is automatically positioned by drive motors in response to signals from a numerical control unit.

6 Claims, 1 Drawing Sheet

U.S. Patent    Aug. 16, 1988    4,763,402
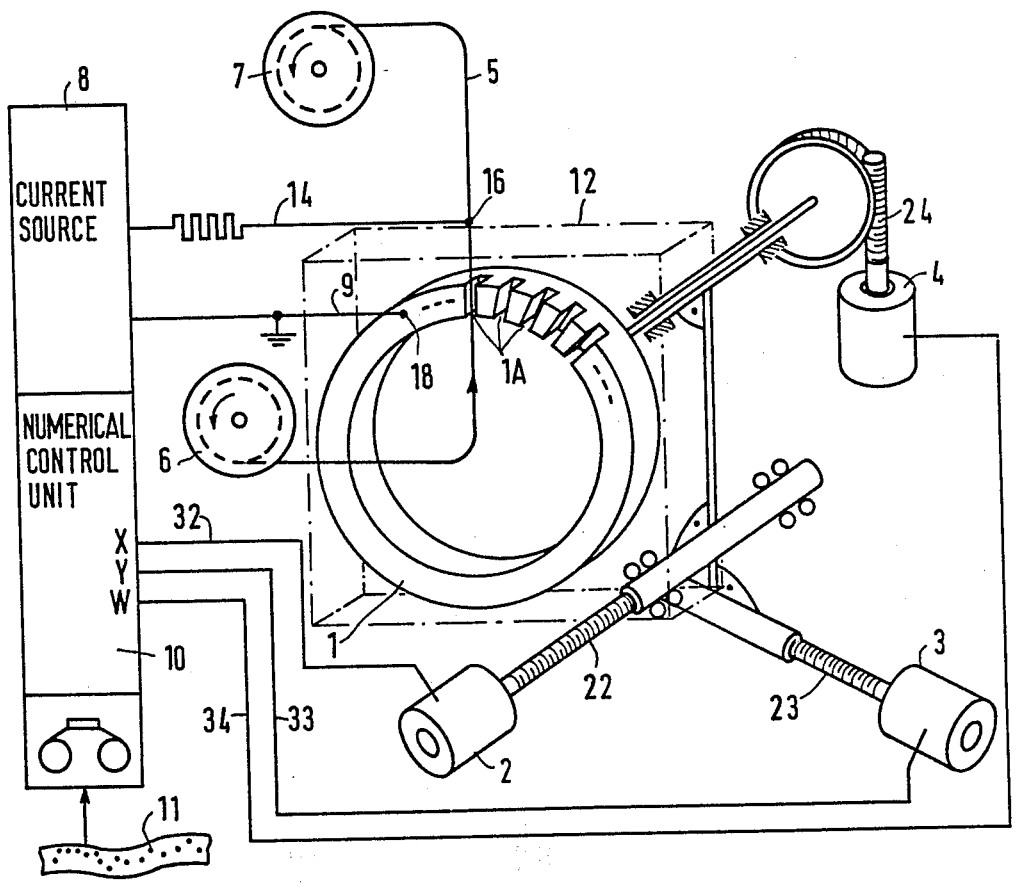

METHOD FOR MANUFACTURING AN ANNULAR COMPONENT IN THE FORM OF WOUND FERROMAGNETIC TAPE PROVIDED WITH SLOTS AT AN END FACE FOR USE IN AN ELECTRICAL AXIAL-FIELD MACHINE

BACKGROUND OF THE INVENTION

This invention relates to a method and apparatus for manufacturing an annular or ring-shaped component in the form of a wound ferromagnetic tape provided at an end face with a plurality of slots, the component to be used in an electrical axial-field machine.

As described in German Patent No. 700,879, such an annular or ring-shaped component is manufactured from a ferromagnetic tape by providing individual cutouts along an edge of the tape at a stamping station upstream of a winding station. To accomplish the stamping out of the cutouts, the motion of the magnetic tape past the stamping station and the concomitant coiling of the tape at the winding station must be periodically interrupted. For this reason, a continuous winding motion of the ferromagnetic tape under a constant tension is impossible. In addition, the spacings of the cutouts from each other must be increased as the winding operation progresses, i.e., as the circumference of the ring winding increases, in order to maintain an alignment of the cutouts from winding to winding to form a plurality of slots. Inasmuch as such a spacing is impossible to control exactly, expensive reworking and smoothing of the resulting slot walls are required.

In an improvement of this manufacturing method, disclosed in German Laid-Open Application (Ausleqeschrift) No. 10 33 768, a hardenable synthetic resin is continuously applied to the ferromagnetic tape as a lubricating, insulating and binding agent which joins the individual layers of the slotted ring winding to form a solid part. The formation of the slots is accomplished during the winding operation and at the winding station. The slots are formed by a stamping tool guided from the inside of the partially formed ring through recesses in a winding arbor. In this method, the cutouts along the edge of the ferromagnetic tape are properly spaced from one another owing to a uniform angular advancement of the winding arbor with the partially formed ring wound thereon. In addition, the stamping tool is able to machine the edges of the cutout in the outer tape layer during each respective stamping operation, thereby deburring the inner slot division walls. A disadvantage of the improved manufacturing method disclosed in German Auslegeschrift No. 10 33 768 is that a continuous winding process cannot proceed inasmuch as during the stamping operation the partially formed ring must be stationary. Moreover, a uniform thickness of the layers in the ring is not possible because the stamping process itself causes local deformations. Sufficiently smooth inside walls of the slots are not obtainable because of the wear of the stamping tools. In addition, only radially extending slots can be fabricated.

An object of the present invention is to provide an improved method for manufacturing an electric axial-field machine component of the above-described type.

A concomitant object of the present invention is to provide an apparatus for performing, or facilitating the performance of, such an improved method.

Another, more particular, object of the present invention is to provide such a method and apparatus wherein the manufactured machine part has a uniform winding density and is provided with smooth-walled slots of any selected shape and position.

SUMMARY OF THE INVENTION

A method for manufacturing a ring-shaped component with slots in an end face for use in an electrical axial-field machine comprises the steps of winding ferromagnetic tape into the shape of a ring, applying hardenable synthetic resin material to the tape and holding the tape to maintain the shape of the ring. The synthetic resin material is hardened while the shape of the ring is maintained. Subsequently, slots are electro-eroded in an end face of the ring.

Advantageously, the synthetic resin material is applied to the tape prior to the winding thereof to form the ring-shaped component. However, the synthetic resin material may alternatively or additionally be applied to the wound tape.

The present invention is also directed to an apparatus for manufacturing from a ring blank a ring-shaped component with slots in an end surface for use in an electrical axial-field machine. The ring blank takes the form of a length of wound ferromagnetic tape wherein individual windings are insulated from and attached to adjacent windings by a hardened synthetic resin material. The apparatus in accordance with the invention comprises a holder for holding the ring blank and a support coupled to the holder for adjustably positioning the holder and the ring blank held thereby with respect to three axes. The apparatus further comprises an electro-eroding device including translating members for moving and guiding an electrically energized wire in contact with end face of the ring blank while the blank is held by the holder and for guiding the wire along a line fixed in space to form a slot in the end face of the ring blank. The electro-eroding device further includes a circuit for establishing a current through the wire and the ring blank during linear motion of the wire. The circuit includes a power supply electrically connected to the ring and to the wire. A control unit is operatively coupled to the support for controlling the positioning of the holder and the ring blank prior to each of a series of slotforming operations executed by the electro-eroding device.

Preferably, the three axes along which the holder and the blank are adjustably positioned by the support include two axes of translation and an axis of rotation.

BRIEF DESCRIPTION OF THE DRAWING

The FIGURE of the drawing is a diagram of an apparatus, in accordance with the present invention, for manufacturing from a ring blank a ring-shaped component with slots in an end surface for use in an electrical axial-field machine.

DETAILED DESCRIPTION

In accordance with the present invention, an ferromagnetic tape having a width corresponding to the axial length of a ring to be formed and optionally provided with a superficial insulating layer is unwound from a tape supply reel and transported in a conventional manner through a loop control section (i.e., a loop buffer) to a heating station. At the heating station the tape is fired or heated to straighten the tape out and to eliminate local deformations. At a spraying or dipping station downstream of the heating station, a hardenable synthetic resin material is applied to the moving ferromagnetic tape. The coated tape is then coiled at a winding station downstream of the spraying or dipping station to form an annular or ring-shaped component.

A speed-controlled winding arbor guides the tape through the heating or firing station and through the synthetic resin coating device and winds the coated tape under a constant or uniform tension without interruption until the ring-shaped component has been formed. The inside diameter of the ring is determined by the diameter of the winding arbor, while the outside diameter is determined by the thickness of the ferromagnetic tape, the tension under which the tape is wound and the length of the wound tape.

Upon the completion of the winding process, the tape is severed and the completed ring is held together by a fixture. Both the holding fixture and the ring of ferromagnetic tape are baked to harden the synthetic resin material. Smooth end faces of the hardened ring-shaped body or blank is assured by the uniform application of dosed or measured amounts of the hardenable synthetic resin material to the moving tape.

Upon solidification of the synthetic resin material in the baking operation to form the ring-shaped blank, the blank is provided on at least one end face with slots having a desired number, selected positions and predetermined forms. The slots are provided by cutting them in an electro-erosion process from one or both end faces.

A ring-shaped component manufactured in accordance with the method of the present invention has slots with smooth walls formed without reworking and without burrs.

As illustrated schematically in the drawing, an electro-erosion apparatus for forming slots 1A in a ring-shaped blank 1 of wound ferromagnetic tape of which the individual windings are held together and insulated from each other by a hardened synthetic resin comprises a holder device 12 supported by a positioning frame. The positioning frame includes three drive motors 2, 3 and 4 having respective threaded output shafts 22, 23 and 24 drivingly connected to holder 12 for adjustably positioning the holder and ring-shaped blank 1 held thereby along an x axis and a y axis and about a w axis, i.e., along two mutually orthogonal axes of translation and about an axis of rotation. X-axis motor 2 controls the depth of cut, while y-axis motor 3 determines the position of the cut along a diameter of ring-shaped blank 1. W-axis motor 4 is used to rotate the ring blank about its axis of symmetry and thereby determine the angular orientation of the slots 1A.

The electro-erosion apparatus includes a numerical control unit 10 having output leads 32, 33 and 34 extending to motors 2, 3 and 4 for selectively energizing those motors in accordance with predetermined slot depths, positions or orientations coded on a perforated tape 11.

The electro-erosion apparatus further includes a cutting wire 5 which is unwound at one end from a supply reel 6 during the electro-erosion process and simultaneously wound at an opposite end onto a take-up reel 7. Cutting wire 5 is electrically coupled to a controllable current source 8 via a lead 14 slidably connected at a terminal 16 to wire 5. Ring blank 1 is likewise electrically coupled via a lead 9 in an electrical circuit including current source 8, lead 14 and wire 5. Lead 9 slidably contacts ring blank 1 at a coupling point or terminal 18. The current fed through wire 5 and ring blank 1 is controlled by numerical control unit 10 in accordance with the preprogramming.

The electro-erosion wire cutting device may further include a conventional cooling or rinsing system (not illustrated) for wire 5 and the cutting point on ring blank 1.

Although the invention has been described in terms of particular embodiments and applications, one of ordinary skill in the art, in light of this teaching, can generate additional embodiments and modifications without departing from the spirit of or exceeding the scope of the claimed invention. For example, the preprogramming of the slot depths, positions and orientations may be implemented by conventional means other than perforated tape 11. Moreover, the coordinate axes along and about which motion of holder 12 and ring-shaped blank 1 takes place need not necessarily be the two translation axes and one rotation axis disclosed hereinabove. Other orthogonal coordinate systems may be utilized. Accordingly, it is to be understood that the illustrations and descriptions herein are proffered by way of example to facilitate comprehension of the invention and should not be construed to limit the scope thereof.

What is claimed is:

1. A method for manufacturing a ring-shaped component with slots in an end face for use in an electrical axial-field machine, said method comprising the steps of:

winding ferromagnetic tape into the shape of a ring;
applying hardenable synthetic resin material to said tape;
holding said tape to maintain the shape of said ring;
hardening said sythetic resin material while maintaining the shape of said ring; and
electro-eroding slots in an end face of said ring upon the completion of said step of hardening.

2. The method defined in claim 1 wherein said step of applying is performed on said tape prior to said step of winding.

3. The method defined in claim 2, further comprising the step of applying additional hardenable synthetic resin material to said tape after winding of said tape in said step of winding.

4. The method defined in claim 1 wherein said step of hardening comprises the step of baking said synthetic resin material while maintaining the shape of said ring.

5. The method defined in claim 1, further comprising the steps of unwinding said tape from a supply reel and heating the unwound tape prior to winding said tape in said step of winding.

6. A method for manufacturing a ring-shaped component with slots in an end face for use in an electrical axial-field machine, said method comprising the steps of:

unwinding a tape of ferromagnetic material from a supply reel;
heating the unwound tape to straighten same;
applying hardenable synthetic resin material to the straightened tape;
winding into the shape of a ring the tape provided with the hardenable synthetic resin material;
holding said tape to maintain the shape of said ring;
baking said synthetic resin material while maintaining the shape of said ring, thereby forming a ring blank; and
electro-eroding slots in an end face of said ring blank upon completion of said step of baking.

* * * * *